United States Patent
Yamayoshi (10) Patent No.: US 10,168,851 B2
(45) Date of Patent: Jan. 1, 2019

(54) TOUCH PANEL AND METHOD FOR MANUFACTURING THE SAME

(71) Applicant: Mitsubishi Electric Corporation, Tokyo (JP)

(72) Inventor: Kazushi Yamayoshi, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 52 days.

(21) Appl. No.: 15/601,126

(22) Filed: May 22, 2017

(65) Prior Publication Data
US 2017/0344160 A1    Nov. 30, 2017

(30) Foreign Application Priority Data
May 25, 2016   (JP) ................. 2016-104075

(51) Int. Cl.
*G06F 3/047*  (2006.01)
*G06F 3/044*  (2006.01)

(52) U.S. Cl.
CPC .............. *G06F 3/047* (2013.01); *G06F 3/044* (2013.01); *G06F 2203/04103* (2013.01); *G06F 2203/04111* (2013.01)

(58) Field of Classification Search
CPC .......... G06F 3/044; G06F 2203/04111; G06F 2203/04112; G06F 2203/04103; G06F 3/0412; G06F 2203/04106; G06F 2203/04107; G06F 3/03547; G06F 3/0414; G06F 3/047; G06F 3/0488

USPC .................................................. 345/173–175
See application file for complete search history.

(56) References Cited

U.S. PATENT DOCUMENTS

| 8,159,749 B2 | 4/2012 | Inoue et al. | |
| 8,921,727 B2 * | 12/2014 | Sun | H01H 1/10 200/600 |
| 9,851,859 B2 * | 12/2017 | Park | G06F 3/045 |

FOREIGN PATENT DOCUMENTS

JP      5197418 B2    5/2013

* cited by examiner

*Primary Examiner* — Duc Q Dinh
(74) *Attorney, Agent, or Firm* — Studebaker & Brackett PC

(57) ABSTRACT

A touch panel includes: an transparent substrate; an X wiring line; a Y wiring line; and an inter-layer insulating film which electrically separates the X wiring line and the Y wiring line at an intersection at which the X wiring line and the Y wiring line intersect in a plan view. At the intersection, the bottom layer of one wiring line of the X wiring line and the Y wiring line continues on the lower surface side of the inter-layer insulating film, and layers of the one wiring line except the bottom layer are divided. Further, at the intersection, layers of the other wiring line of the X wiring line and the Y wiring line except the top layer of the other wiring line are divided, and the top layer of the other wiring line continues on the upper surface side.

3 Claims, 8 Drawing Sheets

TOUCH PANEL AND METHOD FOR MANUFACTURING THE SAME

BACKGROUND OF THE INVENTION

Field of the Invention

The present invention relates to a touch panel and a method for manufacturing the touch panel, and relates, in particular, to a technology appropriate for use in the outdoor.

Description of the Background Art

Touch panels for outdoor use are required to have good display properties even in an environment under the sun light in which incident light intensity is high. On the other hand, electrodes and wiring lines for touch panels are required to have low resistance and to be easily processed, and as metals to meet the requirement, aluminum (Al) alloy or copper (Cu) alloy is used to form the electrodes and wiring lines.

However, these metals have high reflectance and have a problem that, in an environment at which an incident light intensity entering from outside is high, an incident light is reflected by the metal wiring lines, whereby a good display properties are not obtained.

In order to reduce the reflection of the light entering from outside, it is known that an antireflection film is provided on an aluminum alloy wiring line, for example. For example, Japanese Patent No. 5197418 discloses an antireflection film configured with an aluminum film and an aluminum nitride film. Japanese Patent No. 5197418 further discloses that, when an aluminum nitride film has a higher degree of nitridation, the reflectance lowers, and the disclosure means that the aluminum nitride film functions as an antireflection film.

In the field of touch panel, projection capacitive type touch panels are currently becoming a mainstream. A touch panel has a matrix wiring configured with X wiring lines and Y wiring lines provided on a transparent substrate made of glass, PET (polyethylene terephthalate), or the like, where the X wiring lines include X detection electrodes for detecting an X position and the Y wiring lines include Y detection electrodes for detecting a Y position.

It is preferable not only that the electrodes and the wiring lines be low-reflective but also that the wiring lines do not block light; therefore, the line width is currently 3 μm or thinner.

It requires appropriate equipment to make the line width be 3 μm or thinner, and if a foreign matter is attached to a wiring line part in the manufacturing process, the disconnection occurs and will not operate normally. Accordingly, there is a problem that the production efficiency is lowered with many defects in the manufacturing process and that quality abnormality is caused.

SUMMARY OF THE INVENTION

An object of the present invention is to provide a touch panel which is excellent in visibility and high in quality, and to provide a method for manufacturing the touch panel.

A touch panel according to the present invention includes a substrate, a row-direction wiring line, a column-direction wiring line, and an inter-layer insulating film. The row-direction wiring line is disposed, on the substrate, to extend in the row direction. The column-direction wiring line is disposed, on the substrate, to extend in the column direction and to intersect with the row-direction wiring line in a plan view. The inter-layer insulating film electrically separates the row-direction wiring line and the column-direction wiring line at an intersection at which the row-direction wiring line and the column-direction wiring line intersect in a plan view. Each of the row-direction wiring line and the column-direction wiring line has a laminated structure made up of at least two layers. At the intersection, a bottom layer of one wiring line of the row-direction wiring line and the column-direction wiring line continues on a lower surface side of the inter-layer insulating film, and layers of the one wiring line except the bottom layer are divided. Further, at the intersection, layers of the other wiring line of the row-direction wiring line and the column-direction wiring line except a top layer of the other wiring line are divided, and a top layer of the other wiring line continues on the upper surface side.

Each of the row-direction wiring line and the column-direction wiring line has a laminated structure made up of at least two layers. At the intersection, a bottom layer of one wiring line of the row-direction wiring line and the column-direction wiring line continues on a lower surface side of the inter-layer insulating film, and layers of the one wiring line except the bottom layer are divided. Further, at the intersection, layers of the other wiring line of the row-direction wiring line and the column-direction wiring line except the top layer of the other wiring line are divided, and the top layer of the other wiring line continues on the upper surface side.

Therefore, because each of the row-direction wiring line and the column-direction wiring line has a laminated structure made up of at least two layers, when the row-direction wiring line and the column-direction wiring line are configured in thin line structures so as to reduce reflection and light shielding and when one of the layers is disconnected in the manufacturing process, the wiring line having the disconnected layer functions as a row-direction wiring line or a column-direction wiring line. This arrangement can achieve a high-quality touch panel.

Further, because the row-direction wiring line and the column-direction wiring line are configured in thin line structures, it is possible to reduce reflection and light shielding by the row-direction wiring line and the column-direction wiring line, whereby a touch panel having excellent visibility can be achieved.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
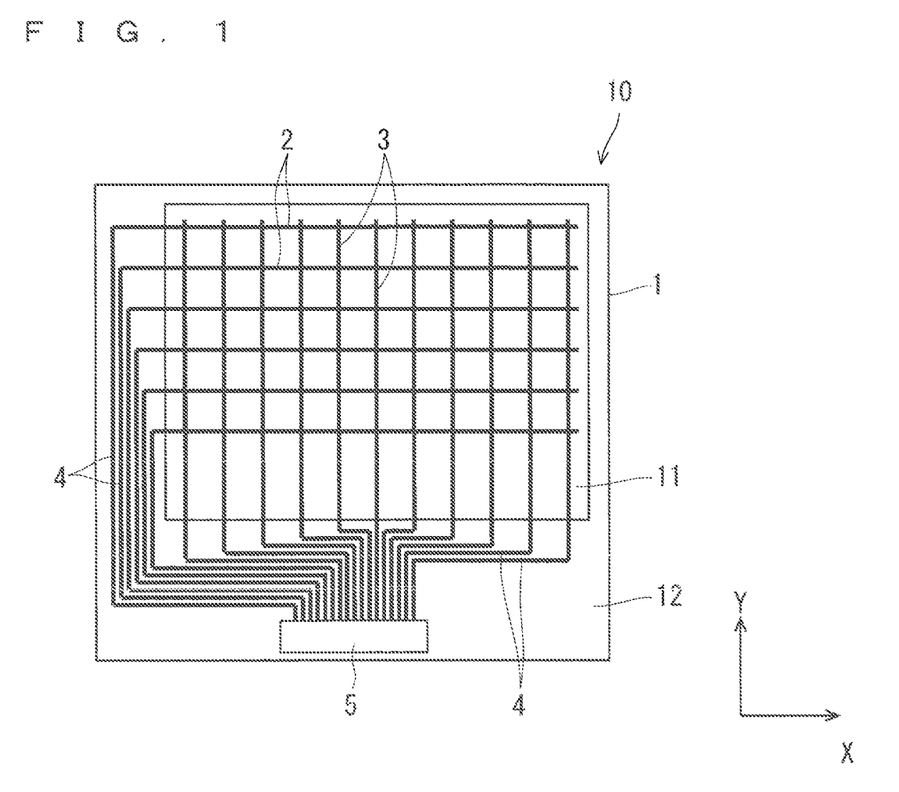
FIG. 1 is a plan view illustrating an overall structure of a touch panel according to a first preferred embodiment.

A first preferred embodiment of the present invention will be described below with reference to the drawings. FIG. 1 is a plan view illustrating an overall structure of a touch panel 10 according to the first preferred embodiment.

First, an overall structure of the touch panel 10 will be described. As shown in FIG. 1, the touch panel 10 is a projection capacitive type touch panel and is equipped with a transparent substrate 1 as a substrate, X wiring lines 2 as row-direction wiring lines, and Y wiring lines 3 as column-direction wiring lines. The transparent substrate 1 is configured with glass, for example. The X wiring lines 2 each include an X detection electrode for detecting an X position and are disposed on the transparent substrate 1 to extend in an X direction. The Y wiring lines 3 each include a Y detection electrode for detecting a Y position and are disposed on the transparent substrate 1 to extend in a Y direction and to intersect with the X wiring lines 2 in the plan view. Here, the X direction is the row direction, and the Y direction is the column direction.

The touch panel 10 is configured to have a matrix wiring configured with the X wiring lines 2 and the Y wiring lines 3. The touch panel 10 is equipped with: a sensor area 11 in which the X detection electrodes of the X wiring lines 2 and the Y detection electrodes of the Y wiring lines 3 are disposed; and a frame area 12 on the outer circumference side of the sensor area 11.

As illustrated in FIG. 1, lead-out wiring lines 4 extending from each of the X wiring lines 2 and the Y wiring lines 3 in the sensor area 11 are electrically connected to a terminal 5 for signal input/output from and to the outside; and the touch panel 10 is electrically connected to a control board (not shown) or the like through the terminal 5.

Figure 2:
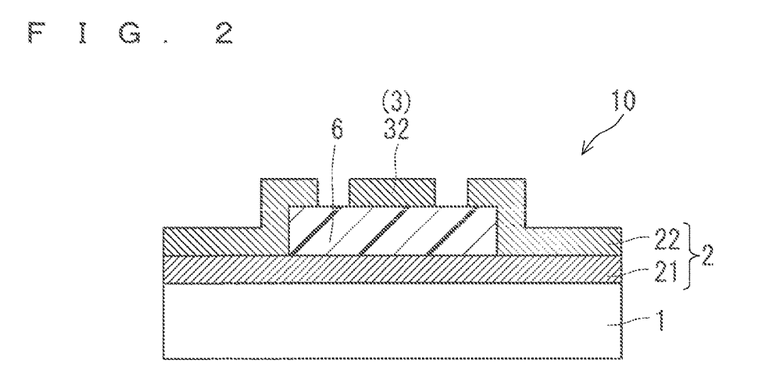
FIG. 2 is a sectional view, in the X direction, of the touch panel at a part at which an X wiring line and a Y wiring line intersect.
Figure 3:
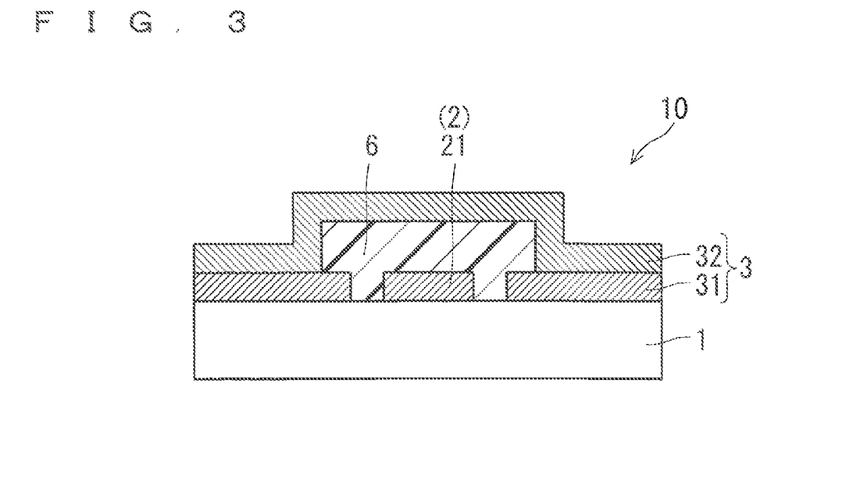
FIG. 3 is a sectional view, in the Y direction, of the touch panel at the part at which the X wiring line and the Y wiring line intersect.

Next, a cross-sectional structure of the touch panel 10 will be described. FIG. 2 is a sectional view, in the X direction, of the touch panel 10 at a part at which the X wiring line 2 and the Y wiring line 3 intersect. FIG. 3 is a sectional view, in the Y direction, of the touch panel 10 at the part at which the X wiring line 2 and the Y wiring line 3 intersect.

As shown in FIG. 2, an X wiring line 2 is disposed on the transparent substrate 1. The X wiring line 2 has a laminated structure made up of two layers and has a lower layer side X wiring line 21 as a lower layer side row direction wiring line and an upper layer side X wiring line 22 as an upper layer side row direction wiring line. The lower layer side X wiring line 21 is disposed on the transparent substrate 1 to extend in the X direction. The upper layer side X wiring line 22 is disposed to be overlaid on the lower layer side X wiring line 21 and to extend in the X direction.

As illustrated in FIG. 3, a Y wiring line 3 is disposed on the transparent substrate 1. The Y wiring line 3 has a laminated structure made up of two layers and has a lower layer side Y wiring line 31 as a lower layer side column direction wiring line and an upper layer side Y wiring line 32 as an upper layer side column direction wiring line. The lower layer side Y wiring line 31 is disposed on the transparent substrate 1 to extend in the Y direction. The upper layer side Y wiring line 32 is disposed to be overlaid on the lower layer side Y wiring line 31 and to extend in the Y direction. Note that, although the description is given in the case that each of the X wiring line 2 and the Y wiring line 3 has two layers, it is only necessary for each of the X wiring line 2 and the wiring line 3 only to have an laminated structure made up of at least two layers, and it is possible to use an laminated structure made up of three or more layers.

As illustrated in FIG. 2 and FIG. 3, the touch panel 10 is further equipped with an island-like inter-layer insulating film 6. The inter-layer insulating film 6 is disposed at an intersection at which the X wiring line 2 and the Y wiring line 3 intersect in a plan view so as to separate in the vertical direction the X wiring line 2 and the Y wiring line 3 at the intersection, thereby electrically separating the X wiring line 2 and the Y wiring line 3. Now, a structure of the intersection will be described. At the intersection, a bottom layer of one wiring line of the X wiring line 2 and the Y wiring line 3 continues on the lower surface side of the inter-layer insulating film 6, and the layers of the one wiring line except the bottom layer are divided. Further, at the intersection, the layers of the other wiring line of the X wiring line 2 and the Y wiring line 3 except the top layer of the other wiring line are divided, and the top layer of the other wiring line continues on the upper surface side. More specifically, at the intersection, the lower layer side X wiring line 21 of the X wiring line 2 as one wiring line of the X wiring line 2 and the Y wiring line 3 continues on the lower surface side of the inter-layer insulating film 6, and the upper layer side X wiring line 22 is divided on the upper surface side of the inter-layer insulating film 6. Further, at the intersection, the lower layer side Y wiring line 31 of the Y wiring line 3 as the other wiring line of the X wiring line 2 and the Y wiring line 3 is divided on the lower surface side of the inter-layer insulating film 6, and the upper layer side Y wiring line 32 continues on the upper surface side of the inter-layer insulating film 6.

Still more specifically, at the intersection, the lower layer side X wiring line 21 is disposed on the transparent substrate 1 without being divided, and the lower layer side Y wiring line 31 is divided so as not to be in contact with the lower layer side X wiring line 21, with predetermined gaps provided between the lower layer side Y wiring line 31 and the lower layer side X wiring line 21. Further, at the intersection, the upper layer side Y wiring line 32 is disposed without being divided in such a manner that the upper layer side Y wiring line 32 gets over the inter-layer insulating film 6, and the upper layer side X wiring line 22 is divided with predetermined gaps between the upper layer side X wiring line 22 and the upper layer side Y wiring line 32 so as not to be in contact with the upper layer side Y wiring line 32 in such a manner that the upper layer side X wiring line 22 gets over the inter-layer insulating film 6. With this arrangement, at the intersection, each of the X wiring line 2 and the Y wiring line 3 is electrically connected only by the thickness of the wiring line on any of the upper layer side and the lower layer side.

Each of the lower layer side X wiring line 21 and the lower layer side Y wiring line 31 is configured with, for example, low-resistance material Al-based alloy such as AlNiNd and has a thickness of 200 nm, for example. Each of the upper layer side X wiring line 22 and the upper layer side Y wiring line 32 is configured with, for example, low-resistance material Al-based alloy such as AlNiNd and has a thickness of 200 nm, for example. Note that, in order to reduce reflection of light entering from outside, it is preferable that an antireflection film be provided on each of the surfaces of the upper layer side X wiring line 22 and the upper layer side Y wiring line 32, which are the top layers of the X wiring line 2 and the Y wiring line 3. The antireflection film is configured with a highly nitrided aluminum nitride film having a composition ratio of 30 to 50 at % (atomic percent) of nitrogen, for example.

As the inter-layer insulating film 6, photosensitive organic material or the like can be used, for example. The thickness of the inter-layer insulating film 6 only has to be about 2 μm to keep the electric insulation between the upper layer side wiring line and the lower layer side wiring line. If the inter-layer insulating film 6 is too thin, the insulation deteriorates, and detection sensitivity accordingly lowers, or discharge is caused between the X wiring line 2 and the Y wiring line 3, thereby causing quality abnormality. Alternatively, if the inter-layer insulating film 6 is too thick, the upper layer side wiring line is likely to make a step-cut at the position at which the upper layer side wiring line gets over the side surface of the inter-layer insulating film 6, thereby causing quality abnormality.

Note that the material for the X wiring line 2 and the Y wiring line 3 is not limited to the above material, and Cu alloy may be used instead of Al-based alloy, which is a low-resistance material. Alternatively, as the antireflection film, a film may be used which is made by performing a blackening process on a surface of a known Cu wiring line.

Figure 4:
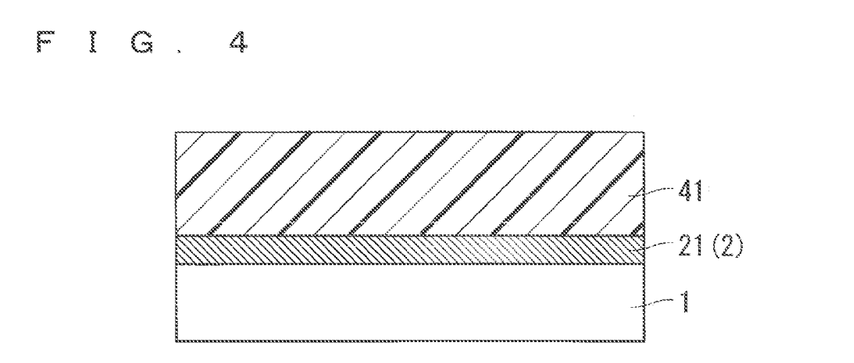
FIG. 4 is a sectional view in the X direction illustrating a first patterning process in a method for manufacturing a touch panel.
Figure 5:
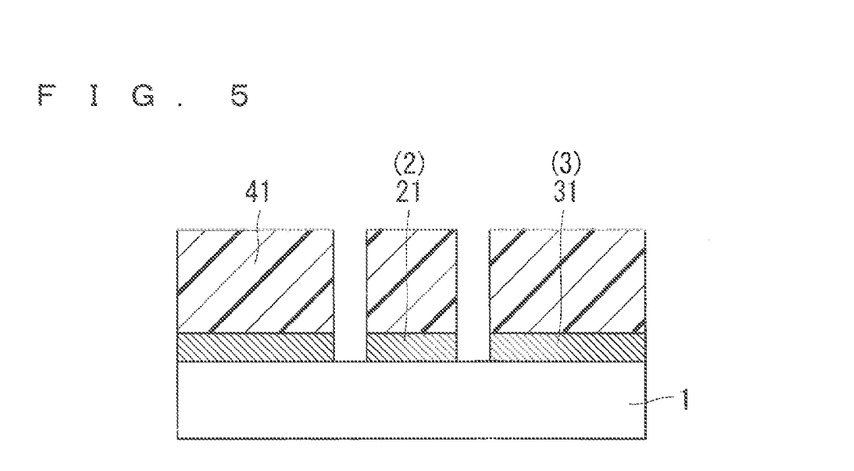
FIG. 5 is a sectional view in the Y direction illustrating the first patterning process in the method for manufacturing a touch panel.
Figure 6:
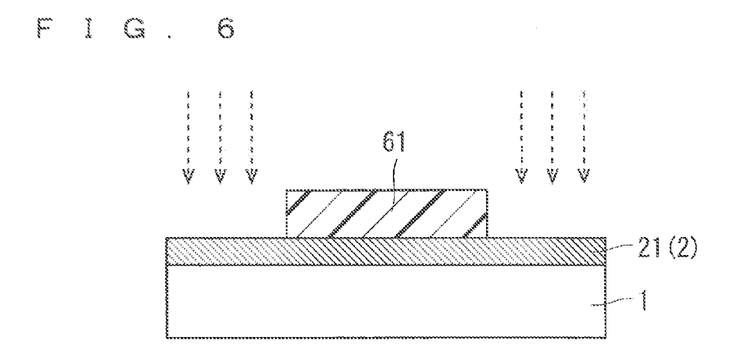
FIG. 6 is a sectional view in the X direction illustrating a process of depositing an inter-layer insulating film in the method for manufacturing a touch panel.
Figure 7:
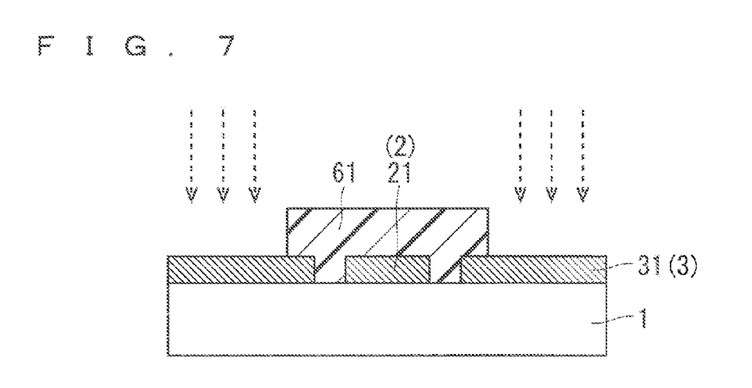
FIG. 7 is a sectional view in the Y direction illustrating the process of depositing the inter-layer insulating film in the method for manufacturing a touch panel.
Figure 8:
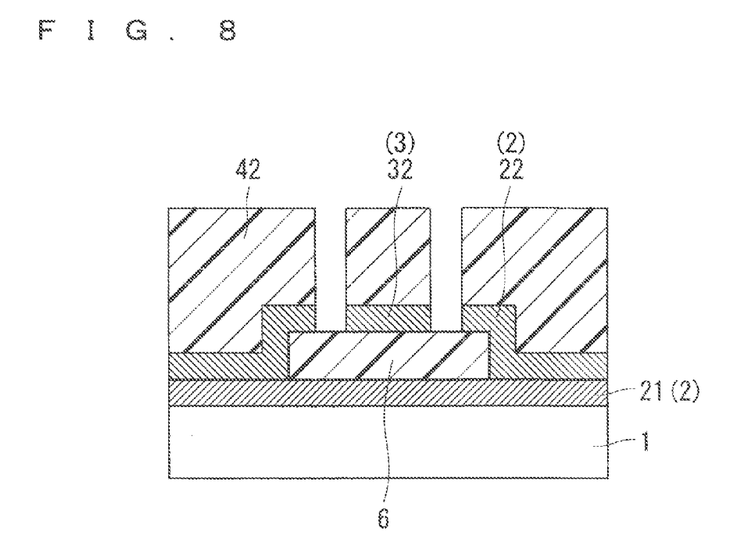
FIG. 8 is a sectional view in the X direction illustrating a second patterning process in the method for manufacturing a touch panel.
Figure 9:
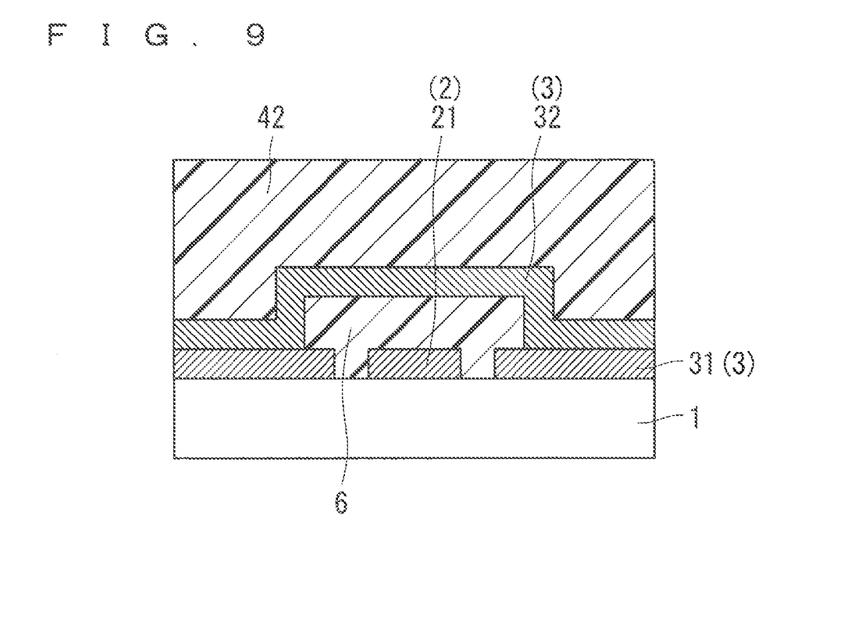
FIG. 9 is a sectional view in the Y direction illustrating the second patterning process in the method for manufacturing a touch panel.

Next, with reference to FIG. 4 to FIG. 9, a method for manufacturing the touch panel 10 will be described. FIG. 4 is a sectional view in the X direction illustrating a first patterning process in the method for manufacturing the touch panel 10, and FIG. 5 is a sectional view in the Y direction illustrating the first patterning process in the method for manufacturing the touch panel 10. FIG. 6 is a sectional view in the X direction illustrating a process of depositing the inter-layer insulating film 6 in the method for manufacturing the touch panel 10, and FIG. 7 is a sectional view in the Y direction illustrating the process of depositing the inter-layer insulating film 6 in the method for manufacturing the touch panel 10. FIG. 8 is a sectional view in the X direction illustrating a second patterning process in the method for manufacturing the touch panel 10, and FIG. 9 is a sectional view in the Y direction illustrating the second patterning process in the method for manufacturing a touch panel. Here, FIG. 4, FIG. 6, and FIG. 8 are sectional views in the X direction, and FIG. 5, FIG. 7, and FIG. 9 are sectional views in the Y direction.

As illustrated in FIG. 4 and FIG. 5, as first-time film deposition, an AlNiNd film functioning as a conductive film is first deposited to have a thickness of 200 nm on the transparent substrate 1 by a sputtering process using an AlNiNd target. Next, as a first-time patterning (corresponding to first patterning), resist material is applied to the AlNiNd film, and exposure and development are then performed to make an intended pattern. A resist pattern 41 after being developed is used as an etching mask to etch the AlNiNd film using, for example, a mixed acid of phosphoric acid, nitric acid, and acetic acid as illustrated in FIG. 4. After that, the resist pattern 41 is removed by a peeling process. Through this process, the lower layer side X wiring line 21 of the X wiring line 2 and the lower layer side Y wiring line 31 of the Y wiring line 3 are formed. At the intersection between the lower layer side X wiring line 21 and the lower layer side Y wiring line 31, the lower layer side X wiring line 21 of the X wiring line 2 continues, and the lower layer side Y wiring line 31 of the Y wiring line 3 is divided. At this time, lead-out wiring lines 4 and the terminal 5 illustrated in FIG. 1 are simultaneously formed, but the description is skipped here.

Next, as illustrated in FIG. 6 and FIG. 7, by applying a photosensitive resin such as acrylic resin to the intersection between the X wiring line 2 and the Y wiring line 3 and performing exposure and development, an acrylic resin pattern 61 is formed in an island shape. In the case of using acrylic resin, baking is then performed at the temperature about 220° C. to provide the inter-layer insulating film 6 with excellent electrical properties.

Next, as illustrated in FIG. 8 and FIG. 9, as second-time film deposition, an AlNiNd film functioning as a conductive film is deposited to have a thickness of 200 nm in the same manner as in the first film deposition. Subsequently, by using the same film deposition device, a highly nitrided aluminum nitride alloy film having a thickness of 50 nm is deposited on the AlNiNd film in an atmosphere including $N_2$ gas by a sputtering process using an AlNiNd target. Note that if the nitridation degree of an aluminum nitride alloy film is low, the film will not be a low-reflection film but a reflective film, and if the nitridation degree is high, the film will not be a low-reflection film but a transparent film; therefore, it is preferable to previously obtain the relationship between partial pressure of $N_2$ and reflection characteristics for a film deposition device to be used and to determine the film deposition conditions for a low-reflection coating having an intended reflectance.

Next, as second-time patterning (corresponding to second patterning), exposure and development are performed so that the upper layer side X wiring line 22 and the upper layer side Y wiring line 32 are respectively overlaid on the lower layer side X wiring line 21 and the lower layer side Y wiring line 31 in the wiring line part except the intersection between the lower layer side X wiring line 21 and the lower layer side Y wiring line 31. At this time, the exposure and the development are performed in such a manner that, at the intersection, the upper layer side X wiring line 22 is divided and the upper layer side Y wiring line 32 continues. Then, mixed acid including phosphoric acid, nitric acid, and acetic acid is used to etch the aluminum nitride alloy film and the AlNiNd film. After that, the resist pattern 42 is removed by a peeling process. Through the above process, the upper layer side X wiring line 22 and the upper layer side Y wiring line 32 are respectively overlaid on the lower layer side X wiring line 21 and the lower layer side Y wiring line 31; and at the intersection, the upper layer side X wiring line 22 is divided, and the upper layer side Y wiring line 32 continues.

As described above, each of the X wiring line 2 and the Y wiring line 3 has a two-layer structure in the wiring line part except the intersection between the X wiring line 2 and the Y wiring line 3. Therefore, even if a disconnection is caused due to a foreign matter stuck during any one of the first patterning process and the second patterning process, the wiring line is completed in the other process. Therefore, each of the X wiring line 2 and the Y wiring line 3 functions as a redundant wiring line. With this arrangement, the touch panel 10 does not become defective, and the production efficiency can be high.

In the above, the described configuration is as follows: at the intersection, the lower layer side X wiring line 21 continues on the lower surface side of the inter-layer insulating film 6, and the upper layer side X wiring line 22 is divided on the upper surface side of the inter-layer insulating film 6; and at the intersection, the lower layer side Y wiring line 31 is divided on the lower surface side of the inter-layer insulating film 6, and the upper layer side Y wiring line 32 continues on the upper surface side of the inter-layer insulating film 6. However, the configuration is not limited to the above configuration. Specifically, the configuration may be as follows: at the intersection, the lower layer side Y wiring line 31 continues on the lower surface side of the inter-layer insulating film 6, and the upper layer side Y wiring line 32 is divided on the upper surface side of the inter-layer insulating film 6; and at the intersection, the lower layer side X wiring line 21 is divided on the lower surface side of the inter-layer insulating film 6, and the upper layer side X wiring line 22 continues on the upper surface side of the inter-layer insulating film 6.

Next, there will be described a method for reducing the line width of the wiring line part except at the intersection between the X wiring line 2 and the Y wiring line 3 with reference to FIG. 10 to FIG. 14. FIG. 10 to FIG. 14 are sectional views in the X direction illustrating a line-width reduction process in the method for manufacturing the touch panel 10. Although a description will be given only on the lower layer side wiring line of the X wiring line 2, the same description applies to the upper layer side wiring line of the X wiring line 2 and the Y wiring line 3.

Figure 10:
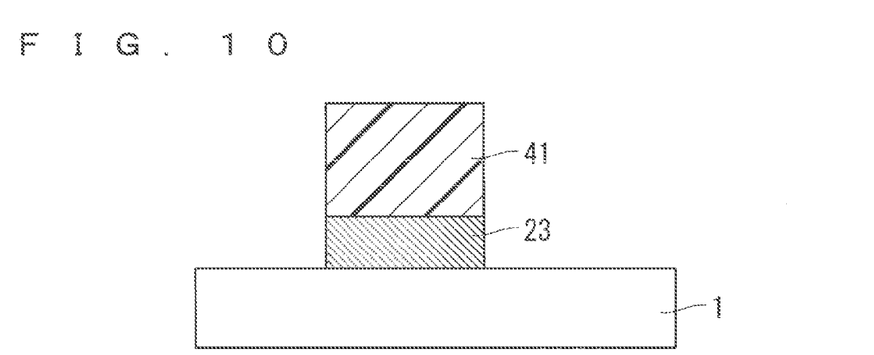
FIGS. 10 to 14 are sectional views in the X direction each illustrating a line-width reduction process in the method for manufacturing a touch panel.
Figure 11:
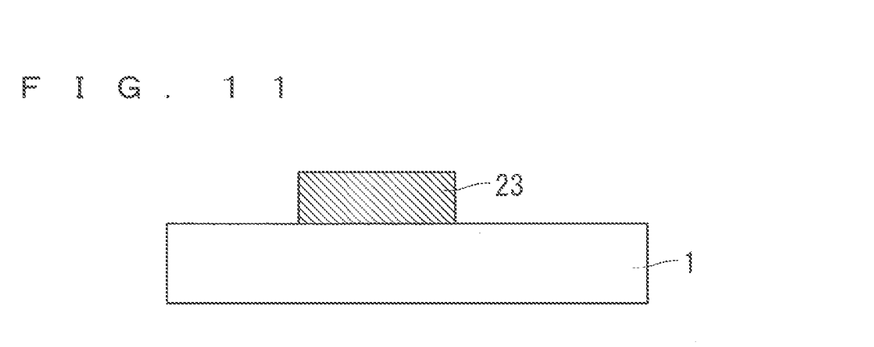

As illustrated in FIG. 10, after an AlNiNd film, far example, is deposited, a resist pattern 41 is formed from one side surface of the both side surfaces of a wiring line 24 (see FIG. 14) which will become a wiring line later, where the resist pattern 41 has a width a little wider than the width of the wiring line 24. After that, first-time etching and peeling are performed to form an X wiring line 23 having a width a little wider than the width of the wiring line 24 as illustrated in FIG. 11.

Figure 12:
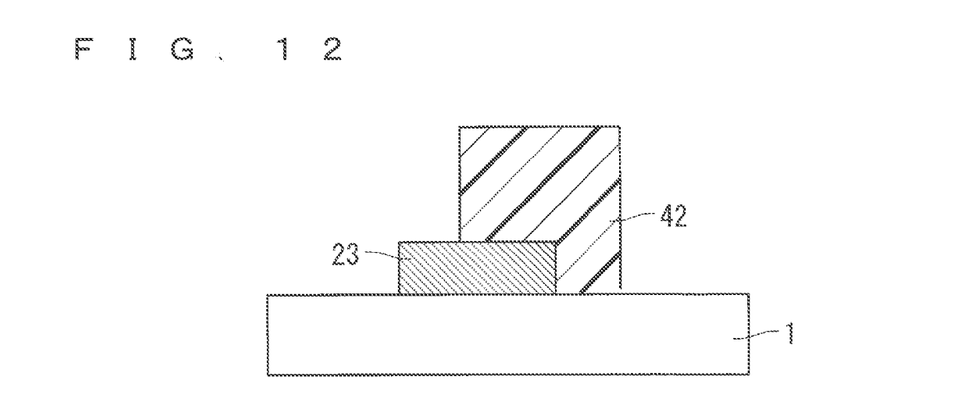
Figure 13:
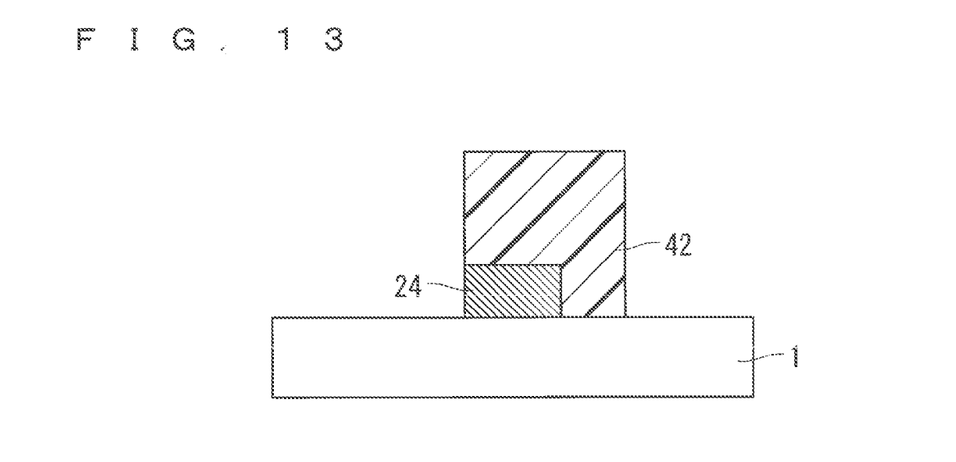
Figure 14:
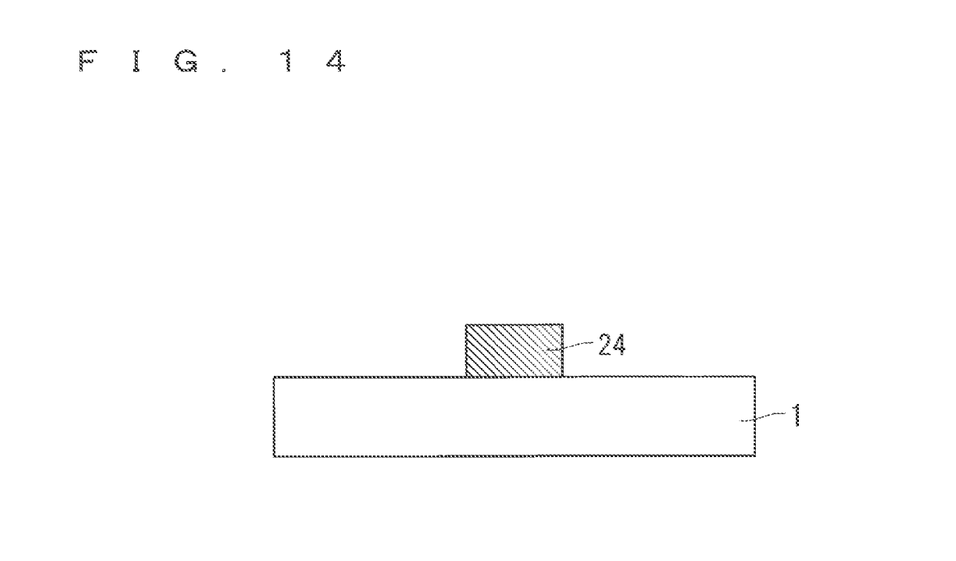

Next, as illustrated in FIG. 12, a resist pattern 42 is formed which is slightly shifted, from the other side surface of the both side surfaces of the X wiring line 24 (see FIG. 14) which will become a wiring line later, with respect to the resist pattern 41 in the width direction of the X wiring line 23. As illustrated in FIG. 13, second-time etching is performed on the part in which the surface of the X wiring line 23 is exposed. After that, peeling is performed, and the X wiring line 24 whose width has been reduced is formed as illustrated in FIG. 14. As described above, two patterning processes can easily reduce the line width.

Figure 17:
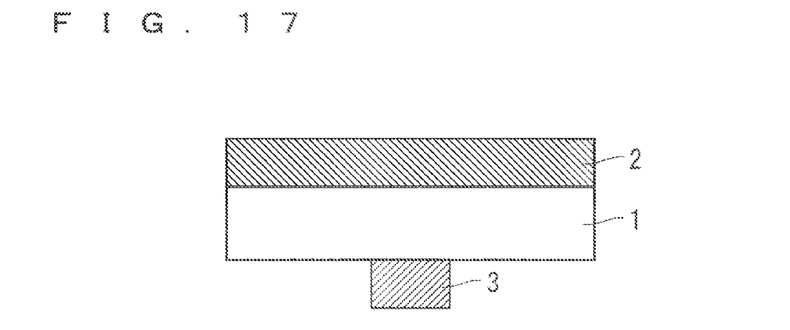
FIGS. 17, 19 and 21 are sectional views, in the X direction, of a touch panel according to a conventional art at a part at which an X wiring line and a Y wiring line intersect.
Figure 18:
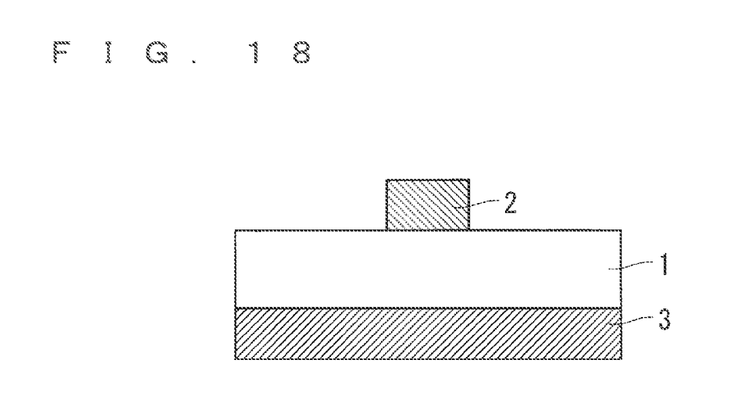
FIGS. 18, 20, and 22 are sectional views, in the Y direction, of a touch panel according to a conventional art at the part at which the X wiring line and the Y wiring line intersect.
Figure 19:
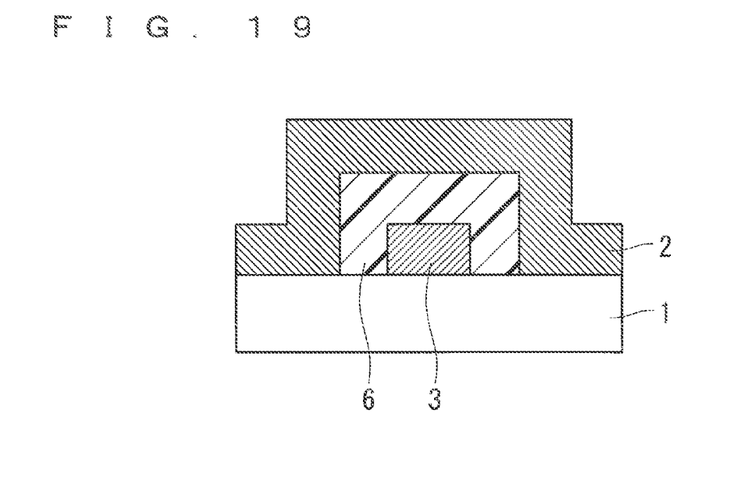
Figure 20:
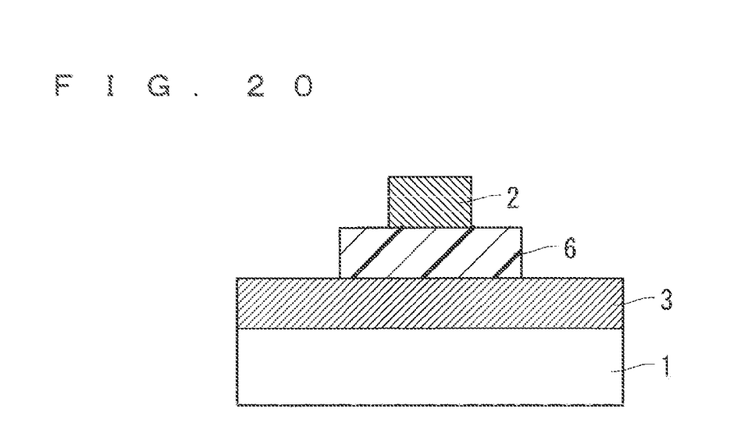
Figure 21:
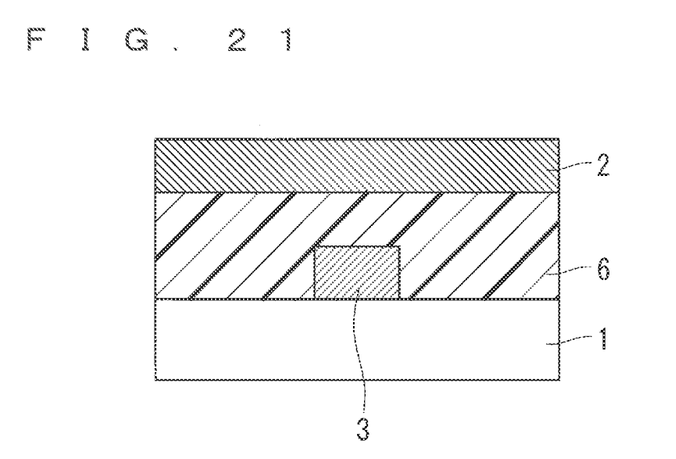
Figure 22:
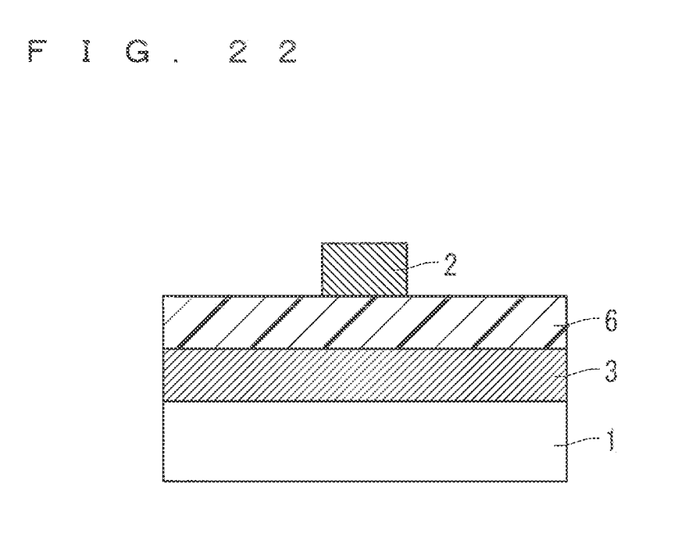

Next, a description will be given on how the touch panel 10 according to the first preferred embodiment operates and effects, compared with the case of a conventional art. FIG. 17 to FIG. 22 are sectional views at intersections an X wiring line and a Y wiring line of a touch panel according to a conventional art intersect. Here, FIG. 17, FIG. 19, and FIG. 21 are sectional views in the X direction, and FIG. 18, FIG. 20, and FIG. 22 are sectional views in the Y direction.

In the configuration illustrated in FIG. 17 and FIG. 18, an X wiring line 2 and a Y wiring line 3 are respectively disposed on the front surface and the back surface of a transparent substrate 1 in the vertical direction. In order to make clear the difference from the present preferred embodiment, the wiring material and the interlayer insulating film material are assumed to be the same. In the configuration illustrated in FIG. 17 and FIG. 18, the X wiring line 2 and the Y wiring line 3 sterically intersect by sandwiching the transparent substrate 1. However, in this configuration, a wiring line needs to be formed also on the rear surface of the transparent substrate 1, it is apparent that the manufacturing process is accordingly complex. Further, there is a problem that a defect is likely to occur during the manufacturing process.

In the configuration illustrated in FIG. 19 and FIG. 20, an inter-layer insulating film 6 is disposed on the intersection between an X wiring line 2 and a Y wiring line 3 on a transparent substrate 1, and the wiring lines intersect on each of the upper surface side and the lower surface side of the inter-layer insulating film 6. In the configuration illustrated in FIG. 19 and FIG. 20, the Y wiring line 3 disposed on the lower surface side of the inter-layer insulating film 6 has a thickness of 400 nm, which is different from that in the present preferred embodiment. Therefore, in consideration of the thickness, the film thickness of the inter-layer insulating film 6 has to be about 3 µm. However, as described above, if the inter-layer insulating film 6 is thicker, the wiring line is likely to make a step-cut, whereby quality abnormality will be caused.

In the present preferred embodiment, the wiring line part has a laminated structure, and the wiring line part is formed by two processes; thus, even in the case that a disconnection is caused by a foreign matter stuck during any one of the two processes, if the wiring line is completed in the other process, the wiring line functions as a wiring line, whereby there is no problem. With this configuration, the touch panel 10 does not become defective; therefore, the production efficiency can be high. On the other hand, in the configuration illustrated in FIG. 19 and FIG. 20, each of the X wiring line 2 and the Y wiring line 3 is formed by a single process; thus, if there is a problem such as a disconnection in any one of the processes, the wiring line becomes defective, whereby the wiring line does not function as a wiring line.

In the configuration illustrated in FIG. 21 and FIG. 22, an X wiring line 2 and a Y wiring line 3 are disposed such that the X wiring line 2 and the Y wiring line 3 sandwich, vertically from both sides, the inter-layer insulating film 6 uniformly disposed on a transparent substrate 1. However, in the configuration illustrated in FIG. 21 and FIG. 22, an electric charge is likely to be stored in the inter-layer insulating film 6, a discharge is likely to occur between the X wiring line 2 and the Y wiring line 3. Therefore, quality abnormality tends to occur.

Compared with these configurations, in the touch panel 10 according to the first preferred embodiment, each of the X wiring line 2 and the Y wiring line 3 has a laminated structure made up of at least two layers. At the intersection, the bottom layer of one wiring line of the X wiring line 2 and the Y wiring line 3 continues on the lower surface side of the inter-layer insulating film 6, and the layers of the one wiring line except the bottom layer are divided. Further, at the intersection, the layers of the other wiring line of the X wiring line 2 and the Y wiring line 3 except the top layer of the other wiring line are divided, and the top layer of the other wiring line continues on the upper surface side of the inter-layer insulating film 6. More specifically, the X wiring line 2 has the lower layer side X wiring line 21 and the upper layer side X wiring line 22 overlaid on the lower layer side X wiring line 21, and the Y wiring line 3 has the lower layer side Y wiring line 31 and the upper layer side Y wiring line 32 overlaid on the lower layer side Y wiring line 31. At the intersection, the lower layer side of one wiring line of the X wiring line 2 and the Y wiring line 3 continues on the lower surface side of the inter-layer insulating film 6, and the upper layer side of the one wiring line is divided on the upper surface side of the inter-layer insulating film 6. Further, at the intersection, the lower layer side of the other wiring line of the X wiring line 2 and the Y wiring line 3 is divided on the lower surface side of the inter-layer insulating film 6, and the upper layer side of the other wiring line of the X wiring line 2 and the Y wiring line 3 continues on the upper surface side of the inter-layer insulating film 6.

Further, a method for manufacturing a touch panel 10 according to the first preferred embodiment includes step (a) of depositing a conductive film on a transparent substrate 1, and performing first patterning on the conductive film to form: a lower layer side X wiring line 21 extending in a row direction; and a lower layer side Y wiring line 31 intersecting in a plan view with the lower layer side X wiring line 21. At an intersection at which the lower layer side X wiring line 21 and the lower layer side Y wiring line 31 intersect in a plan view, one wiring line of the lower layer side X wiring line 21 and the lower layer side Y wiring line 31 continues, and the other wiring line of the lower layer side X wiring line 21 and the lower layer side Y wiring line 31 is divided. The method further includes: step (b) of depositing an inter-layer insulating film 6 at the intersection; and step (c) of depositing a conductive film on the lower layer side X wiring line 21, the lower layer side Y wiring line 31, and the inter-layer insulating film 6, and performing second patterning on the conductive film to form in a wiring line part except the intersection: an upper layer side X wiring line 22 overlaid on the lower layer side X wiring line 21; and an upper layer side Y wiring line 32 overlaid on the lower layer side Y wiring line 31. At the intersection, one wiring line, of the upper layer side X wiring line 22 and the upper layer side Y wiring line 32, overlaid on one wiring line of the lower layer side X wiring line 21 and the lower layer side Y wiring line 31 is divided. Further, at the intersection, the other wiring line, of the upper layer side X wiring line 22 and the upper layer side Y wiring line 32, overlaid on the other wiring line of the lower layer side X wiring line 21 and the lower layer side Y wiring line 31 continues.

Thus, because each of the X wiring line 2 and the Y wiring line 3 has a laminated structure made up of two layers, in the case that the X wiring line 2 and the Y wiring line 3 are configured in thin line structures so as to reduce reflection and light shielding, even if a disconnection occurs to one layer (in other words, one of the upper layer side and the lower layer side) during a manufacturing process, the wiring line functions as an X wiring line 2 or a Y wiring line 3. This configuration can achieve a high quality touch panel 10.

Further, when the X wiring line 2 and the Y wiring line 3 are configured in thin line structures, it is possible to reduce reflection and light shielding by the X wiring line 2 and the Y wiring line 3, whereby it is possible to achieve a touch panel 10 excellent in visibility.

Further, step (a) includes a step of reducing the line widths of the lower layer side X wiring line 21 and the lower layer side Y wiring line 31 in the wiring line part except the intersection, and step (c) includes a step of reducing the line widths of the upper layer side X wiring line 22 and the upper layer side Y wiring line 32 in the wiring line part except the intersection. By these steps, it is possible to improve the visibility of the touch panel 10 and to suppress disconnection at the intersection at the same time.

Further, because the touch panel 10 is further equipped with antireflection films disposed on the surfaces of the upper layer side X wiring line 22 and the upper layer side Y wiring line 32, which are the top layers of the X wiring line 2 and the Y wiring line 3, the reflection on the upper layer side X wiring line 22 and the upper layer side Y wiring line 32 is prevented, so that the visibility of the touch panel 10 can be further increased.

Second Preferred Embodiment

Figure 15:
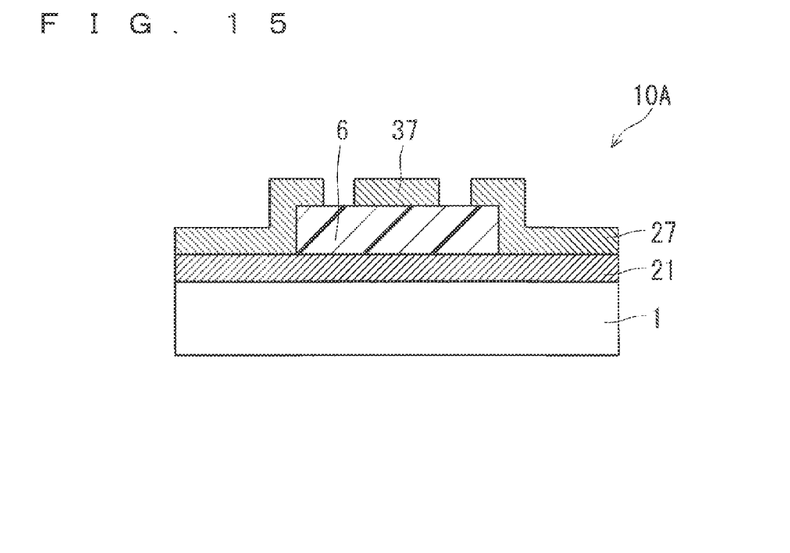
FIG. 15 is a sectional view, in the X direction, of a touch panel according to a second preferred embodiment at a part at which an X wiring line and a Y wiring line intersect.
Figure 16:
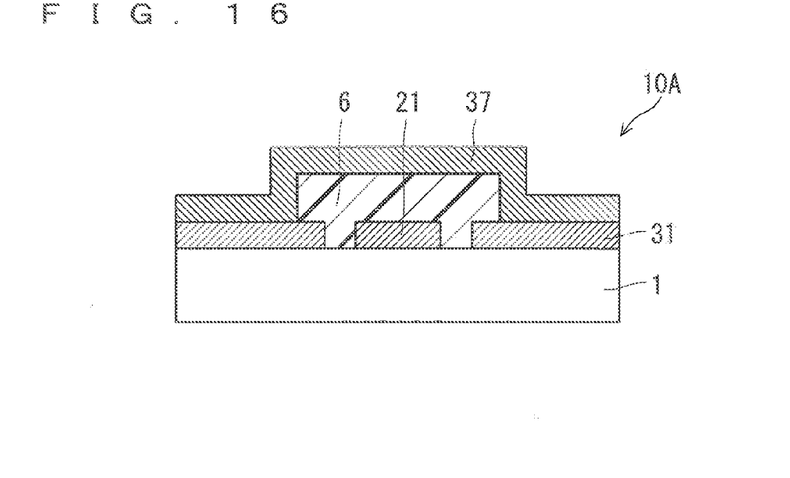
FIG. 16 is a sectional view, in the Y direction, of the touch panel according to the second preferred embodiment at the part at which the X wiring line and the Y wiring line intersect.

Next, a touch panel 10A according to a second preferred embodiment will be described. FIG. 15 is a sectional view, in the X direction, of the touch panel 10A according to the second preferred embodiment at a part at which an X wiring line 2 and a Y wiring line 3 intersect. FIG. 16 is a sectional view, in the Y direction, of the touch panel 10A according to the second preferred embodiment at the part at which the X wiring line 2 and the Y wiring line 3 intersect. Note that in the second preferred embodiment, the same components as those described in the first preferred embodiment are assigned the same reference numerals and are not described again.

In the first preferred embodiment, antireflection films are deposited on the surfaces of the upper layer side X wiring line 22 and the upper layer side Y wiring line 32; however, in the second preferred embodiment, instead of providing antireflection films, an upper layer side X wiring line 27 and an upper layer side Y wiring line 37, which are the top layers of the X wiring line 2 and the Y wiring line 3, are conductive wiring lines having refractive indexes higher than those of a lower layer side X wiring line 21 and a lower layer side Y wiring line 31, which are the layers of the X wiring line 2 and the Y wiring line 3 except the top layers. More specifically, the lower layer side X wiring line 21 and the lower layer side Y wiring line 31 are each made up of a film of Al-based alloy, which is low-resistance material such as AlNiNd; a low-reflection coating is formed by depositing an aluminum nitride alloy film having a thickness of 50 nm; and the upper layer side X wiring line 27 and the upper layer side Y wiring line 37 are deposited to form high refractive index transparent conductive wiring lines.

It is possible to take advantage of the high refractive index of the high refractive index transparent conductive wiring line to further reduce the reflection of light from outside. For example, when a material having a refractive index of about 1.7 to 2.4 is selected and the film thickness is made to be 30 nm to 70 nm, the reflectance of the X wiring line 2 and the Y wiring line 3 can be further reduced. As a material for a transparent cap film having a refractive index of about 1.7 to 2.4, examples include a transparent conductive film of IZO, ITO, SnO, ZnO, InO, and the like and a transparent dielectric film of SiN, $Al_2O_3$, transparent AlN (composition ratio of 1:1), TaO, NbO, TiO, and the like.

In the touch panel 10A according to the second preferred embodiment, the upper layer side X wiring line 27 and the upper layer side Y wiring line 37, which are the top layers of the X wiring line 2 and the Y wiring line 3, are conductive wiring lines having refractive indexes higher than those of the lower layer side X wiring line 21 and the lower layer side Y wiring line 31, which are the layers of the X wiring line 2 and the Y wiring line 3 except the top layers; therefore, it is possible to prevent the reflection by the upper layer side X wiring line 27 and the upper layer side Y wiring line 37, whereby the visibility of the touch panel 10 can be further increased.

While the invention has been shown and described in detail, the foregoing description is in all aspects illustrative and not restrictive. It is therefore understood that numerous modifications and variations can be devised without departing from the scope of the invention.

What is claimed is:

1. A touch panel comprising:
   a substrate;
   a row-direction wiring line disposed, on said substrate, to extend in a row direction;
   a column-direction wiring line disposed, on said substrate, to extend in a column direction and to intersect with said row-direction wiring line in a plan view; and
   an inter-layer insulating film which electrically separates said row-direction wiring line and said column-direction wiring line at an intersection at which said row-direction wiring line and said column-direction wiring line intersect in a plan view,
   wherein each of said row-direction wiring line and said column-direction wiring line has a laminated structure made up of at least two layers,
   at said intersection, a bottom layer of one wiring line of said row-direction wiring line and said column-direction wiring line continues on a lower surface side of said inter-layer insulating film, and layers of the one wiring line except said bottom layer are divided, and
   at said intersection, layers of the other wiring line of said row-direction wiring line and said column-direction wiring line except the top layer of the other wiring line are divided, and the top layer of the other wiring line continues on the upper surface side.

2. The touch panel according to claim 1, further comprising an antireflection film on a surface of a top layer of each of said row-direction wiring line and said column-direction wiring line.

3. The touch panel according to claim 1, wherein the top layers of said row-direction wiring line and said column-direction wiring line are conductive wiring lines having higher refractive indexes than layers of said row-direction wiring line and said column-direction wiring line except the top layers.

* * * * *